Sept. 1, 1925.

H. W. TOBEY

LINE WELDING APPARATUS

Filed April 11, 1925

1,552,248

Inventor:
Harry W. Tobey
by
His Attorney

Patented Sept. 1, 1925.

1,552,248

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

LINE-WELDING APPARATUS.

Application filed April 11, 1925. Serial No. 22,439.

*To all whom it may concern:*

Be it known that I, HARRY W. TOBEY, a citizen of the United States, residing at Pittsfield, in the county of Berkshire, State of Massachusetts, have invented certain new and useful Improvements in Line-Welding Apparatus, of which the following is a specification.

My invention relates to machines for producing a weld between metal parts along an extended line or seam, and has for its object the provision of an improved construction or arrangement of parts for minimizing the welding circuit impedance of such machines.

In the operation of welding machines, difficulty is frequently encountered due to impedance changes produced by variation in the amount of magnetic material enclosed within the circuit through which current is transmitted to the metal of the weld. Thus in the case of welding machines provided with projecting arms spaced apart to receive the work, changes in the impedance of the welding circuit are produced as the electrode and work are moved relatively to one another along the line of the weld. In accordance with my invention, these impedance variations are minimized by the provision of a plurality of welding circuits so interconnected that their impedances vary in inverse order during the welding operation.

My invention will be better understood from the following description when considered in connection with the accompanying drawings and its scope will be pointed out in the appended claims.

Figure 1:
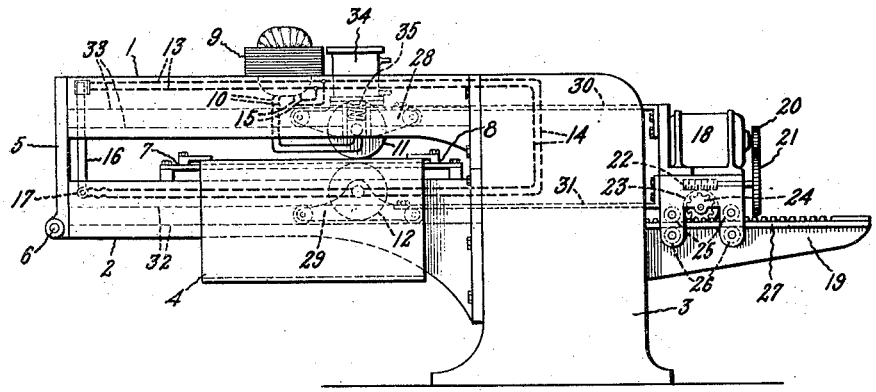
Figure 2:
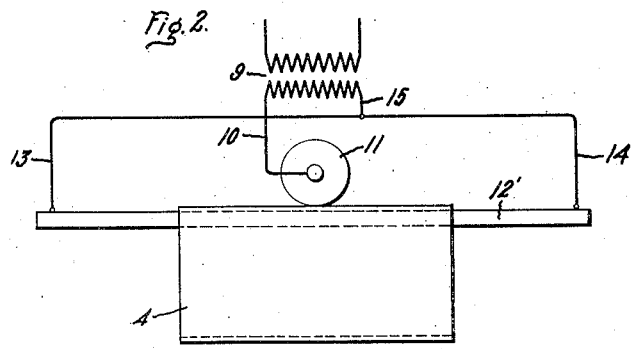
Figure 3:
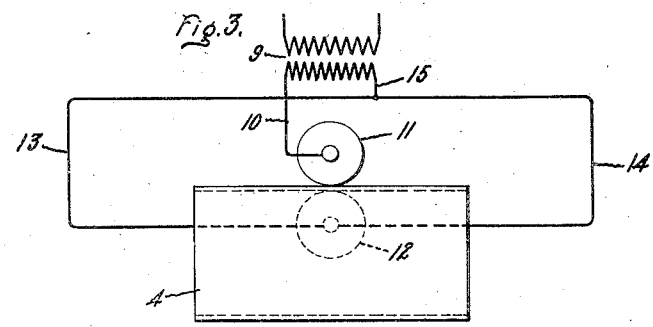

Referring to the drawing, Fig. 1 shows a welding apparatus wherein my invention has been embodied; and Figs. 2 and 3 show different forms of electrodes through which current may be transmitted to the metal of the weld.

Fig. 1 shows a welding machine comprising projecting arms 1 and 2, which are supported by the pedestal 3, are spaced apart to receive the work, shown as a tank 4, and are arranged to be mechanically interconnected at their left hand ends by means of a member 5 hinged to the arm 2 at 6. Suitable means 7 and 8 are provided for clamping the tank 4 to the arm 2 during the welding operation. Current is transmitted between the secondary circuit of the transformer 9 and the metal of the weld through leads 10, electrodes 11 and 12, parallel connected circuits 13 and 14, and secondary leads 15. The secondary leads 10 and 15 and the parallel connected circuits 13 and 14 are shown as consisting of a pair of conductors, and the circuit 13 is shown as provided with a switch 16 hinged at 17 to permit the work to be slipped over the arm 2. It will be apparent however that the arms 1 and 2 and the two parts of the circuit 13 may be permanently interconnected at their left hand ends when the work is of a form permitting it to be moved sidewise through the space between the arms.

In the illustrated embodiment of the invention, relative movement between the electrodes 11 and 12 and the work 4 is produced by means of a motor 18 geared to the rack 19 through gears 20 and 21, worm 22, worm gear 23 and gear 24 which is arranged to cooperate with the rack 19 for moving the motor 18 and the carriage upon which the motor is mounted to and fro along the rack 19. Rollers 25 and 26 are arranged to contact with opposite sides of projections 27 placed at the sides of the rack 19 for preventing vertical movement of the motor carriage which is coupled to the electrode carriages 28 and 29 through suitable longitudinal members 30 and 31. The wheels of the electrode carriage 29 are arranged to move in a trackway indicated by the dotted lines 32 and the wheels of the electrode carriage 28 are arranged likewise to move in a trackway indicated by the dotted lines 33. The axle of the electrode 11 is arranged to be moved vertically by means of a fluid pressure device 34 to the piston of which it is coupled through a spring 35 for the purpose of moving the electrode into and out of engagement with the work. As indicated by Fig. 2, one of the electrodes may be constructed in the form of a bar 12'.

Assuming the circuit 13 to be interrupted and the electrodes to be at the right hand end of the work, it will be readily understood that the impedance of the circuit 14 will be low due to the fact that it surrounds a small amount of magnetic material; that, as the electrodes 11 and 12 are moved to the left, the amount of magnetic material surrounded by the circuit 14 will increase in a manner to augment the impedance of this circuit; and that, as the impedance of the circuit increases, the welding current is likely to be reduced to a value unsuitable for welding. With the circuits 13 and 14 connected in parallel as diagrammatically indicated by Figs. 2 and 3, this change in the welding circuit inductance is greatly reduced for the reason that the inductance of the circuit 13 is decreased as that of the circuit 14 is increased, and the current is maintained within limits suitable for welding.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. A welding machine comprising a pair of projecting members spaced apart to receive therebetween the edges of the parts to be welded, means comprising an electrode arranged to engage successive points along the seam formed by said edges for conducting welding current thereto, and a plurality of welding circuits interconnected with said means to form a circuit surrounding said parts whereby relative movement between said parts and said electrode is caused to vary the impedances of said circuits in inverse order.

2. A welding machine comprising a pair of projecting members spaced apart to receive therebetween the edges of the parts to be welded, a pair of rotatable electrodes arranged to engage opposite sides of said parts and to be rotated along the seam formed by said edges for conducting welding current thereto, and a plurality of welding circuits interconnected with said electrodes to form a circuit surrounding said parts whereby the impedances of said circuit are caused to vary in inverse order as said electrodes are moved along said seam.

3. A welding machine comprising a pair of projecting members spaced apart to receive therebetween the edges of the parts to be welded, means comprising an electrode arranged to engage successive points along the seam formed by said edges for conducting welding current thereto, a plurality of welding circuits interconnected with said means to form circuits surrounding opposite ends of said parts, and means for opening one of said circuits to permit the insertion of said parts between said members.

In witness whereof, I have hereunto set my hand this 8th day of April, 1925.

HARRY W. TOBEY.